Patented Aug. 27, 1935

2,012,450

UNITED STATES PATENT OFFICE 2,012,450

WELDING ROD ALLOY

Ira T. Hook, New Haven, Conn., assignor to The American Brass Company, Waterbury, Conn., a corporation of Connecticut No Drawing. Application November 16, 1934, Serial No. 753,299

3 Claims. (Cl. 75—1)

This invention relates to a welding metal, and particularly to a welding rod for welding cupro-nickel alloys to give a better, stronger, more dense and more easily made weld with these alloys than has heretofore been possible.

Both nickel and copper have long been recognized as metals having excellent combinations of strength, ductility and corrosion resistance. In the cupro-nickels the two metals are mutually soluble and each metal contributes to the valuable properties of the resulting alloy. Thus nickel in a cupro-nickel improves the strength at ordinary and elevated temperatures as well as the corrosion resistance with no loss in ductility, while copper improves the workability, and by reason of its lower cost, makes the alloy more widely available.

Thus with the combination of copper and nickel we can produce alloys which withstand such extremely difficult situations as those encountered by condenser tubing, etc. better than any other metal commercially available. Similarly there are other situations where the trouble free performance over long periods of time justifies the use of a high quality cupro-nickel. For instance in pipe lines conveying salt water and other corrosive waters and in tubes and tanks for conveying and storing inflammable liquids such as fuel oil and gasoline, particularly aboard ship where a leak may mean disaster, a high quality metal such as so-called "Super-Nickel" is found very desirable.

However, neither a tube nor a tank is stronger or safer than its welded connections. In these cases the connections must be welded owing to the thinness of the tubes and tank sheets. However, the "Super-Nickel" alloy as well as all of the cupro-nickels are difficult to weld and obtain thereby a sound, strong connection. The reason for this is to be found partly in the closely clinging, very refractory, very insoluble (in a molten flux) nickel oxide and partly in the readiness with which the molten metal takes up gas and rejects it on freezing.

The nickel oxide interferes with the welding operation by interposing a layer of oxide between separate depositions of metal from the weld rod, and the rejection of dissolved gases on solidifying means unsound and porous weld metal. Therefore unless steps are taken to avoid these imperfections the welded connections will be both weak and leaky.

As far as can be learned from a careful search there is at present no welding rod available commercially which is satisfactory for use in the welding of cupro-nickels, and particularly the welding of the widely known so-called "Super-Nickel" composed of 70% copper and 30% nickel, and other cupro-nickel sheets and tubes sold under various trade names such as "Super-Nickel", etc.

For example welding rods having the same composition as that of the 70—30 "Super-Nickel" could readily be made, but a carefully made investigation has proven that such autogenous welds are generally weak and unsound.

I have, however, found that the addition of a small proportion of silicon in a cupro-nickel welding rod in combination with a small amount of manganese enables a weld man to avoid all or nearly all of the weaknesses outlined above. The reason for this is that the silicon and manganese together with an undetermined amount of copper are oxidized first in the heat of a welding flame or arc.

These oxides form a soft fusible glass which melts at a temperature lower than that of the metal and covers the surface of the molten metal with a continuous film. This film protects the metal underneath from further oxidation and is impervious to such gases as carbon-monoxide and hydrogen which otherwise would be dissolved in the molten metal and would separate out when the metal solidifies and make the weld porous. This glass also has a certain value as a flux, particularly with the nickel oxides. Hence the weld metal is kept reasonably free of the metallic oxides of nickel and copper which would make it weak mechanically, and from contamination with gases, which would make it porous and unsound. Strong, dense welds are the result. This condition is obtained, even though the base metal does not contain the silicon, for the weld metal can be melted before the base metal is fused thus covering and protecting the latter from oxidation and gases.

Thus, for example, I have found that by the addition of a suitable proportion of silicon in combination with manganese in an alloy otherwise of approximately the same composition to the 70% copper, 30% nickel cupro-nickel alloy, an excellent welding rod is obtained which yields strong, sound welds. The composition preferred for this welding rod is approximately nickel 29% to 32%, silicon in an appreciable amount up to a maximum of approximately 0.75%, manganese in an appreciable amount up to a maximum of approximately 0.75%, and copper the remainder. The lower limit for the silicon is preferably about 0.05% with approximately the same lower limit for manganese.

The silicon and manganese function in the same manner in welding rods for other cupro-nickels and this rod could be used for welding other cupro-nickel alloys, but for best results and in order that the weld may be of the same color as the base metal it is desirable that the copper-nickel content of the weld rod be approximately the same as that of the silicon free cupro-nickel base metal on which it is to be used. That is the nickel may be proportioned differently to make a welding rod comparable to the silicon free base metal on which it is to be used. Thus for welding cupro-nickels with variations of nickel content of from approximately 15% to 45% and the remainder copper, except for small additions of manganese, the welding rods would be of a composition within the following ranges, nickel 15% to 45%, silicon in an appreciable amount up to a maximum of about 0.75%, manganese in an appreciable amount up to a maximum of about 0.75%, and copper the remainder. The lower limit for the silicon and manganese is preferably about 0.05% for each element.

This improved weld rod is not necessarily confined to use with cupro-nickel alloys but may be employed with other metals.

Although as the metal is described above for use primarily as a welding or filler rod it is not confined to such use. Being a good welding metal it may be used for welded connections in other ways. For example sheets may be made of the metal and placed with the edge of one bent up to overlap an edge of the other plate so the plates can lie in the same plane, and then the overlapped edge melted down to form an autogenous weld where no filler rod or welding rod is used. In this case both plates could be of this material or only the plate with the edge which is melted down, the other plate being of a cupro-nickel alloy as described without the silicon.

Having thus set forth the nature of my invention, what I claim is:

1. A welding or filler rod composed of an alloy of approximately the following composition:

|  | Percent. |
|---|---|
| Nickel | 15 to 45 |
| Silicon in appreciable amount up to | 0.75 |
| Manganese in appreciable amount up to | 0.75 |
| Copper | Remainder |

2. A welding or filler rod for welding cupro-nickel base metals having a nickel content from 15 to 45%, composed of an alloy of approximately the following composition:

|  | Percent. |
|---|---|
| Nickel | 15 to 45 |
| Silicon | 0.05 to 0.75 |
| Manganese | 0.05 to 0.75 |
| Copper | Remainder | and the nickel content in the rod being approximately that of the base metal to be welded.

3. A welding metal composed of an alloy of approximately the following composition:

|  | Percent. |
|---|---|
| Nickel | 29 to 32 |
| Silicon | 0.05 to 0.75 |
| Manganese | 0.05 to 0.75 |
| Copper | Remainder |

IRA T. HOOK.